(12) United States Patent
Ferdows

(10) Patent No.: US 7,571,785 B2
(45) Date of Patent: Aug. 11, 2009

(54) MODULAR ROOF-MOUNTED RADIATOR COMPARTMENT AND OTHER ROOF-MOUNTED UTILITY COMPARTMENTS FOR BUSES

(76) Inventor: Houshang K. Ferdows, 3605 Longwood Ave., Boulder, CO (US) 80303

( * ) Notice: Subject to any disclaimer, the term of this patent is extended or adjusted under 35 U.S.C. 154(b) by 528 days.

(21) Appl. No.: 11/376,631

(22) Filed: Mar. 15, 2006

(65) Prior Publication Data

US 2007/0215398 A1 Sep. 20, 2007

(51) Int. Cl.
*B60K 11/00* (2006.01)
*B60K 11/04* (2006.01)

(52) U.S. Cl. ............ 180/68.1; 180/68.2; 180/68.4; 180/68.6

(58) Field of Classification Search .......... 180/68.1, 180/68.2, 68.4, 68.6
See application file for complete search history.

(56) References Cited

U.S. PATENT DOCUMENTS

| | | | | |
|---|---|---|---|---|
| 1,747,868 A | * | 2/1930 | Guernsey | 105/62.2 |
| 1,921,588 A | * | 8/1933 | Simmon | 180/68.1 |
| 2,247,962 A | * | 7/1941 | Ormsby et al. | 180/68.1 |
| 2,667,843 A | * | 2/1954 | Dean | 105/62.2 |
| 2,784,568 A | | 3/1957 | Schjolin | |
| 4,345,641 A | * | 8/1982 | Hauser | 165/41 |
| 4,607,497 A | | 8/1986 | Ferdows et al. | |
| 4,679,616 A | | 7/1987 | Ferdows et al. | |
| 5,285,654 A | | 2/1994 | Ferdows | |
| 6,415,620 B1 | | 7/2002 | Ferdows | |
| 6,443,253 B1 | * | 9/2002 | Whitehead et al. | 180/68.1 |
| 6,910,529 B2 | * | 6/2005 | Stone et al. | 165/299 |
| 2008/0006461 A1 | * | 1/2008 | Naganuma | 180/69.4 |

* cited by examiner

*Primary Examiner*—Christopher P Ellis
*Assistant Examiner*—John R Olszewski
(74) *Attorney, Agent, or Firm*—The Reilly Intellectual Property Law Firm, P.C.; John E. Reilly

(57) ABSTRACT

A cooling system for vehicles having a modular roof-mounted, low profile compartment and at least one radiator core mounted for horizontal extension but at a slight angle to the roof as well as being spaced above the roof with fans arranged alongside each radiator core for drawing air into the compartment and across the cores, then upwardly and away from the cores and compartment; and coolant lines extend between the cores and different components to be cooled in the vehicle. The radiator cores may be arranged to extend lengthwise along opposite sides of the roof or may extend transversely, and a battery system for a hybrid engine may also be mounted alongside the radiator compartment and in the same manner as described with respect to the radiator cores, the battery compartment being representative of other utility components that may be similarly mounted in low profile compartments.

14 Claims, 4 Drawing Sheets

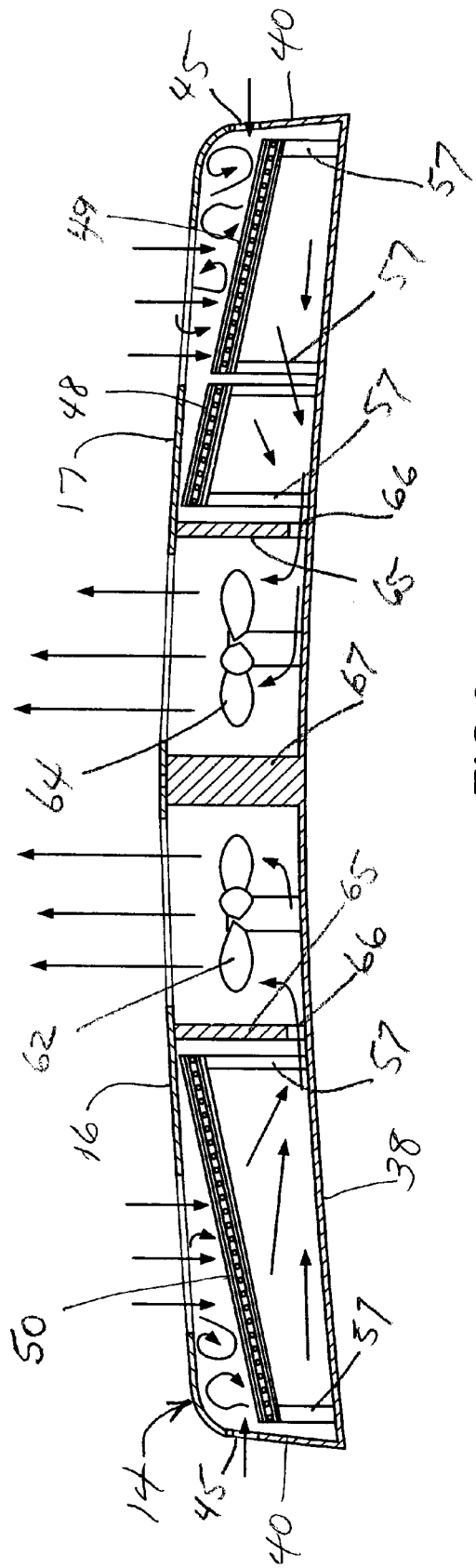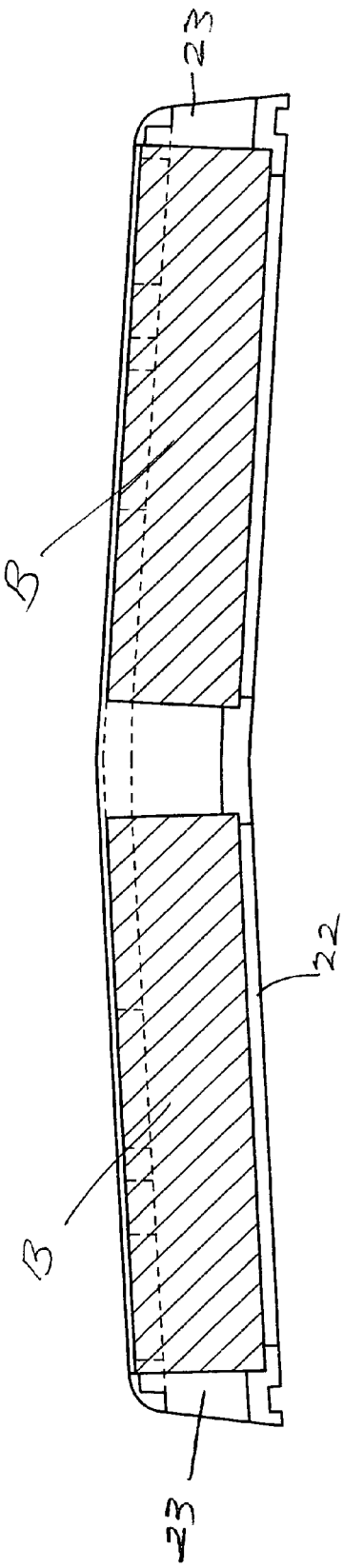

MODULAR ROOF-MOUNTED RADIATOR COMPARTMENT AND OTHER ROOF-MOUNTED UTILITY COMPARTMENTS FOR BUSES

FIELD

This invention relates to radiator assemblies for a vehicle and more particularly to a modular, roof-mounted radiator assembly for larger vehicles, such as, buses.

BACKGROUND

It has been proposed to mount radiators on the roof of a vehicle, a representative approach being disclosed in U.S. Pat. No. 2,784,568 to Schjolin in which the entire air conditioning system as well as the radiator are mounted beneath the roof line and directly above the passenger compartment in order to conserve space. Another approach is disclosed in U.S. Pat. No. 6,910,529 to Stone et al wherein the radiator assembly is mounted on the roof and has fans or blower units mounted above the radiator sections. Among other advantages, separation of the radiator assembly from the engine and mounting along the roof line enables the heat to be dissipated from the radiator and exposes the radiator to cleaner air while at the same time making the engine more accessible and easier to cool. Nevertheless, there is a previously unmet need for a radiator assembly which can be mounted above the roof line while occupying a minimum of space and maintaining a low profile which will permit it to be mounted with the existing roof-mounted air conditioning systems, such as, those of the type disclosed in my U.S. Pat. No. 4,607,497 for ROOF-MOUNTED AIR CONDITIONER SYSTEM HAVING MODULAR EVAPORATOR AND CONDENSER UNITS, U.S. Pat. No. 4,679,616 for ROOF-MOUNTED AIR CONDITIONER SYSTEM HAVING MODULAR EVAPORATOR AND CONDENSER UNITS, U.S. Pat. No. 5,285,654 for EVAPORATIVE COOLING/HEATING SYSTEM WITH ROOF-MOUNTED WATER TANK and U.S. Pat. No. 6,415,620 for DUAL LOOP VEHICLE AIR CONDITIONING SYSTEM incorporated by reference herein and assigned to the assignee of this invention. There are also definite advantages in mounting other equipment and utility components above the roof line, such as, for example batteries to be used for hybrid engines as well as heating and air conditioning systems so long as they are compact enough to meet government height standards. In this same connection, it is desirable to permit interchangeable utilization of roof-mounted battery compartments with other equipment, such as, heater compartments for use in colder climates either with or without roof-mounted radiator compartments. In order to make this possible without mounting of the compartments beneath the roof line or otherwise substantially altering the structure of the vehicle requires extremely low profile compartments so as not to increase the height of the vehicle and particularly larger commercial vehicles above the limits set by the U.S. Department of Transportation. In other respects, it is important that two or more compartments can be so constructed and arranged as to fit together in different combinations to conform to the vehicle structure and to be easily connected into existing accessories on the vehicle. For example, in passenger buses, it is important that the air conditioning system be connected into the duct work which usually extends along opposite sides of the ceiling of the passenger compartment; and to place the radiator section or sections so that their coolant lines can be connected into the engine, transmission and other accessories when desired; and still further to enable mounting of the battery compartment alongside either one of the radiator and air conditioning compartments or heater compartments as well as to facilitate assembly and maintenance of the roof-mounted compartments described.

SUMMARY

Different alternate embodiments are hereinafter disclosed, a feature of which is to provide novel and improved modular low profile roof-mounted utility compartments for vehicles which are extremely compact and highly efficient in operation.

Another feature and advantage of the embodiments herein disclosed is to provide a roof-top radiator compartment which is low profile and is adaptable for mounting at different selected locations on the roof of larger vehicles, such as, buses and which can be mounted alone or adjacent to other low profile compartmentalized systems, such as, for instance, battery and heater compartments as well as the existing roof-top air conditioning systems without increasing the overall height of the vehicle.

Still another feature is to horizontally mount one or more radiator sections in a common low profile housing or compartment with coolant lines running to and from the radiator compartment to different components to be cooled, such as, the engine, transmission and electronic components; and wherein each radiator section can be sized according to the cooling requirements of the component to which it is connected.

In one exemplary embodiment, a cooling system for a vehicle has been devised wherein the vehicle is of the type provided with a standard roof, side walls, front and rear end walls enclosing a passenger section and characterized by having a modular roof-mounted, low profile compartment including a radiator horizontally mounted in the compartment and spaced above the roof, and means for drawing air into the compartment and across the radiator, then upwardly and away from the radiator and compartment. Coolant lines extend between the radiator and different components to be cooled in the vehicle including the engine, transmission and any electronic controls, and there may be one or more radiator sections which extend lengthwise of the vehicle and are arranged to extend along opposite sides of the roof with a common fan or blower system therebetween. Each of the radiator sections or cores is arranged to extend substantially horizontally but at an acute angle to the roof itself in order to achieve the most effective cooling of the radiator section by advancing the air laterally across the radiator prior to its discharge in an upward direction through the fan or blower sections.

In another alternate embodiment, one or more radiator sections may be arranged to extend transversely of the length of the vehicle but once again with the fans or blowers arranged along one side to draw the air somewhat horizontally across the radiator sections then upwardly.

In the embodiments described, the radiator compartment includes opposite side and end walls together with a cover and is provided with inlet and outlet openings to most effectively draw the air across the radiator sections and into the fan area where the air is then discharged in an upward direction from the compartment.

Further features and advantages will become more apparent from the following detailed description of the different embodiments when taken together with the accompanying drawings in which:

BRIEF DESCRIPTION OF THE DRAWINGS

FIG. 3 is a cross-sectional view taken about lines 3-3 of FIG. 2;

FIG. 4 is a cross-sectional view taken about lines 4-4 of FIG. 2;

DETAILED DESCRIPTION OF FIRST EMBODIMENT

Figure 1:
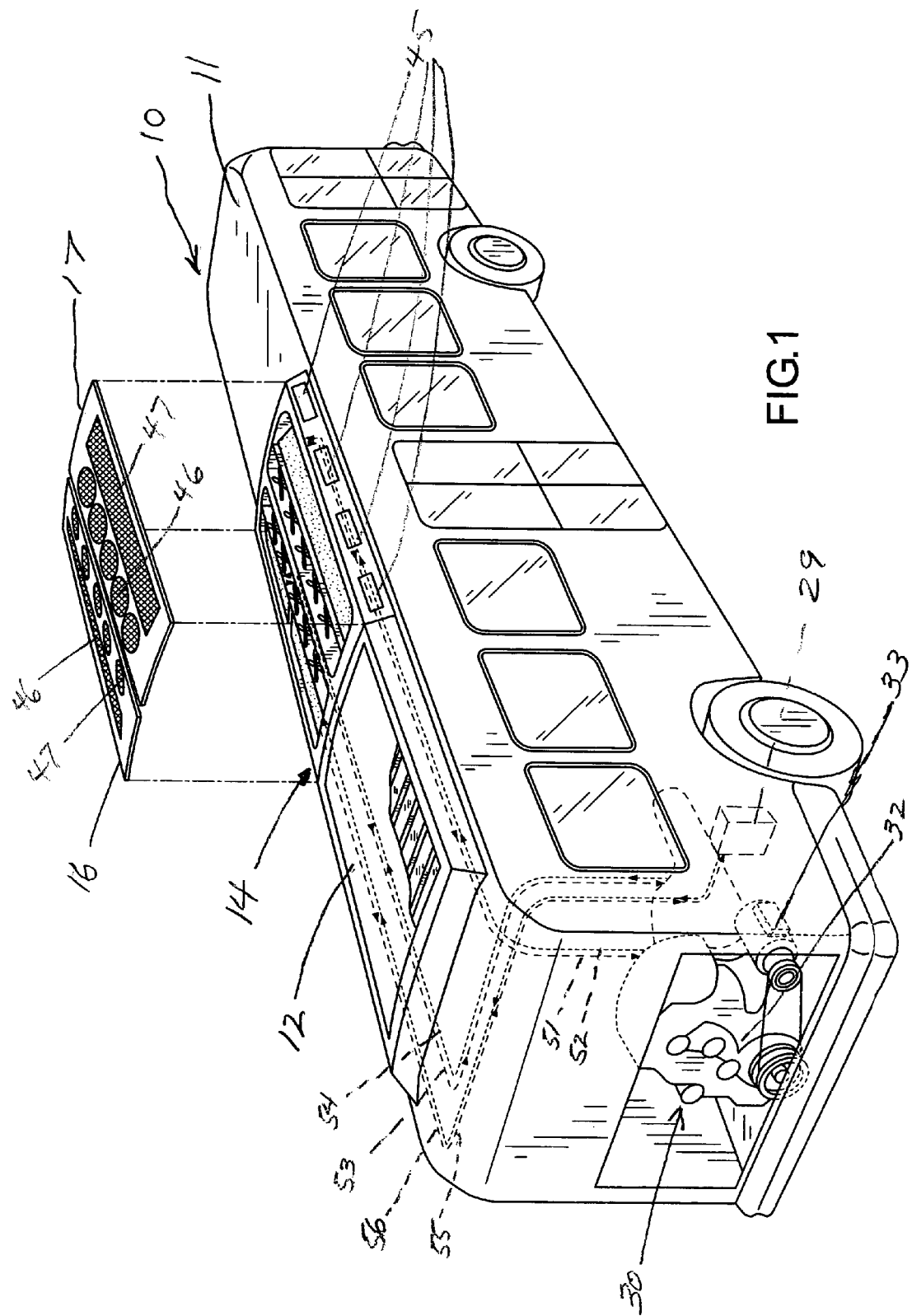
FIG. 1 is a perspective view of a standard bus with exemplary embodiments of the modular, roof-mount battery and radiator assemblies with the cover of the radiator section exploded with respect to the rest of the compartment.

Referring in more detail to the drawings, there is shown in FIGS. 1 to 4 a perspective view of a bus 10 having a first modular compartment 12 and a second modular cooling system 14 including one or more compartments for radiator cores 50, 54 and 56 having cover panels 16 and 17 in juxtaposed relation to one another. The compartments 12 and 14 are mounted on the existing roof surface 11 of the bus in end-to-end relation to one another, and the radiator cover panels 16 and 17 are illustrated in exploded form with respect to the cooling system 14. The battery compartment 12 is representative of other compartments or systems that may be roof-mounted, such as, those illustrated and described in my U.S. Pat. Nos. 4,607,497, 4,679,616, 5,285,654 and 6,415,620.

As a setting for the present invention, the bus 10 is representative of virtually any type of power-driven vehicle having a motive power source and other accessories that require a cooling system into which the cooling system 14 of the present invention can be mounted. Nevertheless, the cooling system 14 is particularly adaptable for use with larger vehicles and is characterized in particular by its low profile, modular construction which enables it to be mounted or retrofit onto existing buses while meeting U.S. Department of Transportation APTA standards which limit the overall height to clearances that must be maintained between the vehicle and overhead objects. Presently, there is a maximum clearance of about 16" above the existing roof line for low-floor passenger buses, and the cooling system 14 efficiently utilizes this allowable space to incorporate the necessary radiators without reducing passenger head room in the interior of the bus.

Again, the bus 10 may be of the type used for conveying passengers from one location to another and is of standard construction including the roof 11, front end 18, rear end 19, opposite sides 20 and 21 as well as the usual front windshield area, side windows and access doors on the curb side of the bus as shown. The compartment 12 is designed to house a battery pack for use in gasoline or diesel electric hybrid buses which use gasoline, diesel or other fuel in combination with electric batteries to power internal combustion engines and electric motors. For the purpose of being able to mount the batteries on the roof of the bus, a plurality of the batteries B are arranged in a single layer and in two rows in juxtaposed relation to one another. The batteries B are firmly secured to a bottom panel 22 of the battery compartment 12 and are confined between opposed, upstanding side panels 23 as well as upstanding front and rear panels 24 and 24'. The rear panel 24' is inclined upwardly and forwardly with spaced vents 25 therein and the bottom panel 22 is slightly bowed or curved in a direction transversely of the roof so as to best conform to the roof contour. The batteries B are of conventional construction and, for example, may be comprised of Ultra Capacitors sold by Maxwell U.S.A., San Diego, Calif. The Ultra Capacitors or batteries, as the case may be are of a size which can be packaged into the compartment 12 and may be connected to an electric motor, not shown, which serves as an alternative motive drive source. Suitable alternatives are NMH batteries, lead acid and NMH batteries, and sodium nickel chloride batteries.

The compartment 12 can be mounted along with other roof-mounted utility components, such as, the air conditioning systems shown in my U.S. Pat. No. 4,607,497 for ROOF-MOUNTED AIR CONDITIONER SYSTEM HAVING MODULAR EVAPORATOR AND CONDENSER UNITS and U.S. Pat. No. 6,415,620 for DUAL LOOP VEHICLE AIR CONDITIONING SYSTEM. The system disclosed in U.S. Pat. No. 4,607,497 includes a pair of evaporators, condensers and a compressor mounted in the compartment 13 as well as the fan or blower units for the evaporator and condenser sections together with the necessary refrigerant flow lines between the evaporators, condensers and compressor in accordance with conventional refrigeration practice. In the alternative, the compressor may be mounted in the rear machinery compartment 30, as shown in FIG. 1. Typically, the compartment 30 houses an internal combustion engine 32, a generator 33, a transmission, not shown, and the usual electronic component controls represented at 29. The generator 33 is connected to the internal combustion engine 32 as well as the fans so as to reduce the engine load and avoid necessity of separate fan drives, such as, hydraulic pumps both for the fans and blowers in the condenser and evaporator sections.

As further shown in FIGS. 1 to 4, the coolant system 14 is comprised of an outer generally rectangular compartment having a shallow curved bottom panel 38 which is sloped in a direction transverse to the length of the bus to conform to the lateral sloping of the roof 18. Opposite side panels 40 and front and rear end panels 42 are inclined upwardly and slightly inwardly toward one another, although the front and rear end panels 42 may be extended at a very slight angle or at right angles to the roof in order to best conform or fit against the front edge of the compartment 12 in the arrangement shown in FIG. 1.

Figure 2:
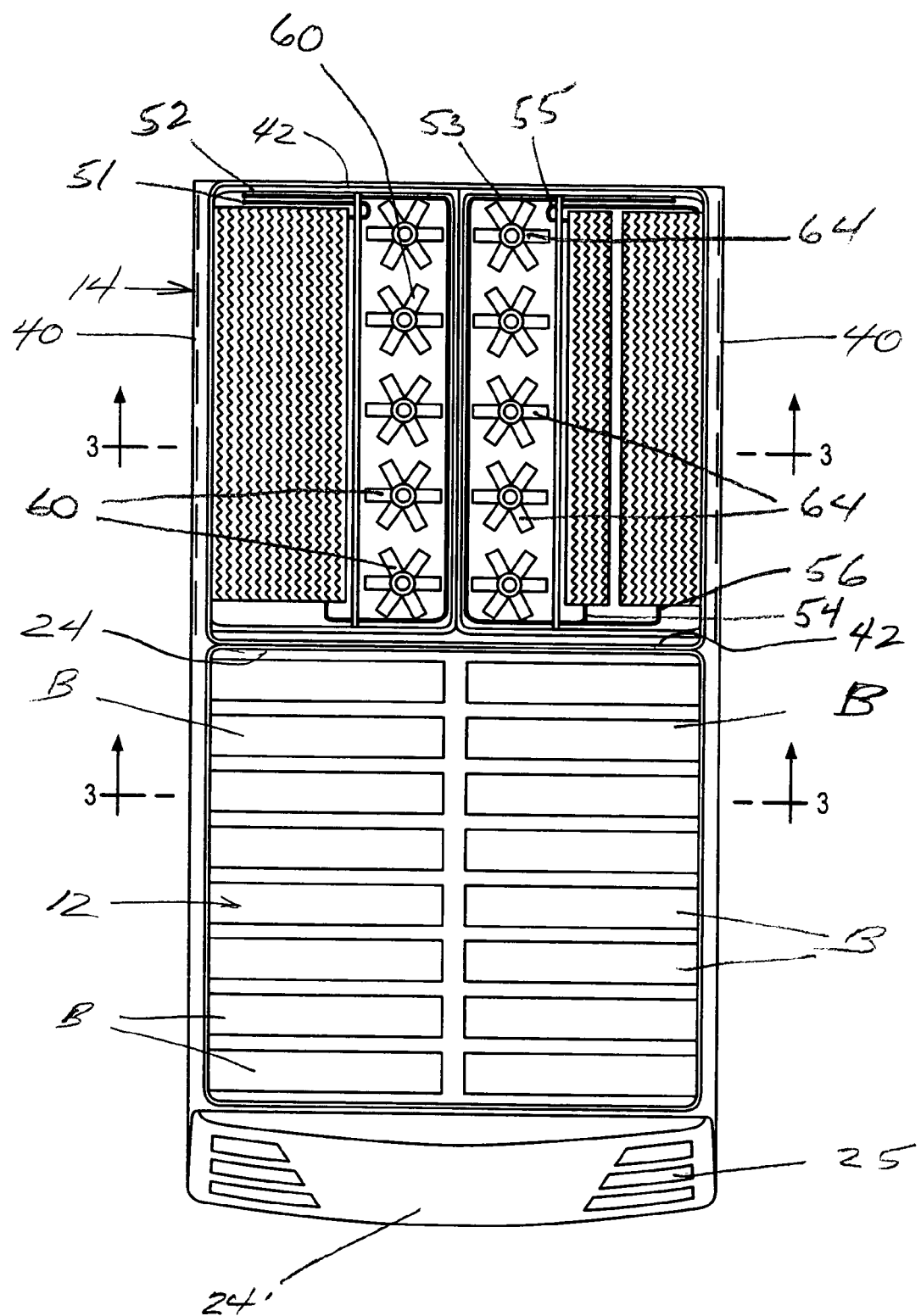
FIG. 2 is a top plan view of the modular compartments shown in FIG. 1.

In the top plan view of FIG. 2, a somewhat modified form of radiator compartment is illustrated in which one of the end panels 42' is sloped at an acute angle to the roof line and provided to permit air to be drawn inwardly through the vents if the cooling compartment 14 is located at the front end of the bus, for example, in the relationship shown in FIG. 1. However, if the cooling compartment is to be situated at the rear end of the bus and the air conditioning system 12 moved to the middle portion of the bus, the end panel 42' would extend in a rearward direction, and the opposite end panel 42 would be formed at an angle to conform to the rear end panel of the air conditioning system 12.

In the arrangement of FIG. 1, the cover panels 16 and 17 are shown in exploded form and each is correspondingly of elongated rectangular configuration and is provided with side vents 45, upper elongated vents 46 and longitudinally spaced circular vents 47. As best seen from FIG. 3, the cover panels 16 and 17 fit tightly into place in side-by-side relation to one another over the top of the compartment.

The major elements of the cooling system comprise spaced parallel radiator cores 48, 49 and 50 extending lengthwise of the bus. The cores 48, 49 and 50 may be selected from any number of automotive radiator cores of a width, or thickness, which will meet government height limitations when they are spaced above the bottom panel 30 for upward extension at an acute angle to the bottom panel. The core 50 extends from an outside edge 40 approximately halfway between the cover 16 and panel 38 and extends angularly upwardly toward the center to terminate at a point in close proximity to the underside of the cover 16. As illustrated in FIG. 1, the radiator cores 50 have a first coolant line represented at 51 which extends via the interior of the bus to the engine 32 cooling compartments and then returns via coolant line 52 through the interior of the bus to the radiator core 50. The opposite side of the compartment 14 includes a pair of elongated radiator cores 48 and 49 in closely spaced juxtaposed relation to one another and together mounted at an acute angle to the roof line so that the inner core terminates at a point in close proximity beneath the cover 16 and the outer core 49 has its lower or outside edge spaced approximately at the midpoint between the cover 16 and base panel 38. The radiator unit 48 includes a first coolant line 53 extending through the interior of the bus to the machinery compartment for the purpose of cooling the transmission and a return line 54 extends from the transmission to the radiator unit 48. Similarly, another coolant line 55 extends from the radiator unit 49 to cool other component accessories and a return line 56 extends from the electronic control package 29 to the radiator unit 49. Although the coolant lines have been described as extending through the interior of the bus it will be apparent that one or more of the lines may extend along the exterior surface of the bus depending entirely upon space limitations within the bus and whether the system 14 is being retrofit to an existing bus as opposed to being provided as original equipment.

A plurality of fans or blower units 62 are arranged for extension along the unit 50, and an additional series of fans 64 are arranged along the units 48 and 49. Each of the radiator units is supported in the desired orientation or attitude by support legs 57 at spaced intervals along their upper edges as well as the lower edge of the intermediate radiator unit 48. Thus, each series of fans 62 and 64 is arranged for extension along the raised side of each of the radiator sections so as to draw air downwardly through the vents 47 and laterally through the side vents 45 so as to flow in the direction of the arrows as illustrated in FIG. 3. The air is drawn into the fan housings by passing through openings 66 in the vertical support panels 65 which define opposite sides of the fan housings together with the intermediate support beam 67. The cover panels 16 are securely attached to the support panels 65 in the center beam 67 as well as to the upper edges of the side and end panels 40 and 42. The number of fan units 62 and 64 may be varied according to the width and length of each radiator unit. Most importantly, however, is the ability to mount the radiator units in a substantially horizontal position so as to occupy the least amount of vertical space possible and maintain a low profile but high capacity cooling compartment for the different vehicle components which require cooling. In this relation, the radiator units may be selected from any number of standard automotive radiators, such as, Moline, NIC and Nissen.

Figure 5:
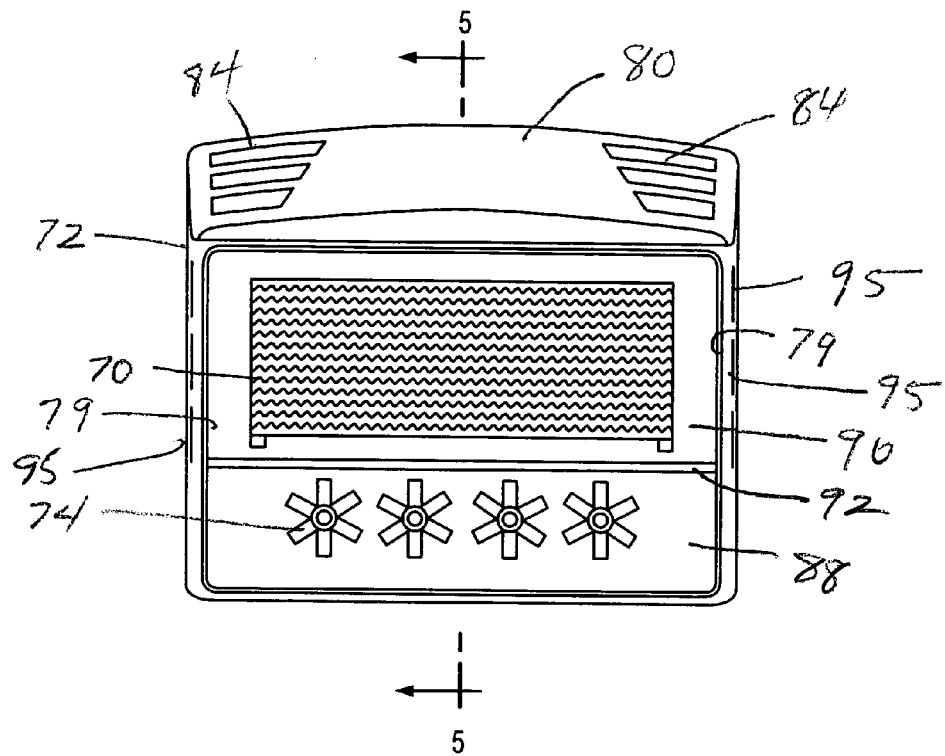
FIG. 5 is a top plan view of another embodiment of a radiator assembly.
Figure 6:
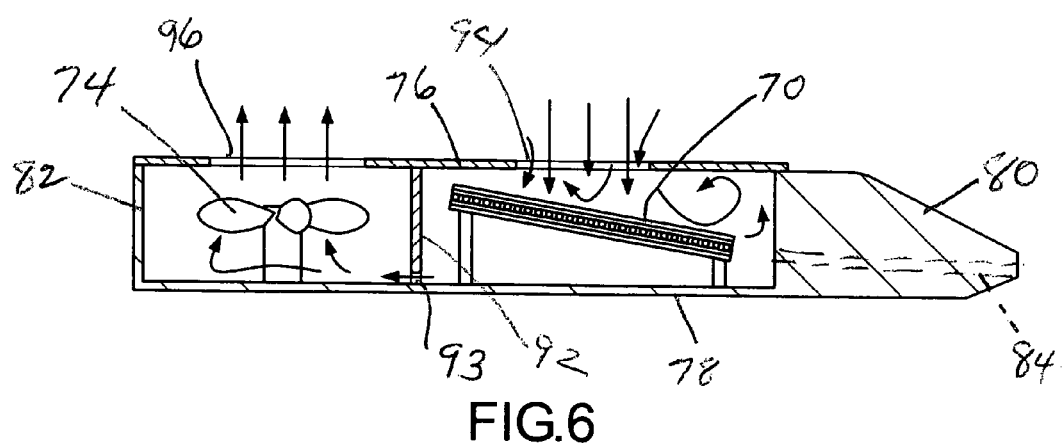
FIG. 6 is a cross-sectional view taken about lines 6-6 of FIG. 5.

Referring to FIGS. 5 and 6, another embodiment is disclosed wherein a radiator core 70 is mounted in a low profile modular housing 72. The radiator core 70 is oriented lengthwise in a direction transversely to the direction of travel of the bus, and a series of fans 74 are arranged directly behind the radiator core 70. In FIG. 5, the modular housing 72 is shown without a cover 76 which is illustrated in FIG. 6. The housing 72 is made up of a base panel 78, opposite side walls 79, a front end wall 80 and a rear end wall 82. As in the embodiment of FIGS. 1 to 3, the base panel 78 is rounded or slightly arcuate to conform to the roof line, and the end wall 80 is provided with a series of ports 84 for the introduction of air into the radiator compartment to be hereinafter described. The radiator housing 72 is divided into a rear radiator fan 88 and forward radiator compartment 90 by a divider wall 92 which is provided with openings 93 to enable passage of air from the radiator compartment through the fan housing as shown by the directional arrows. The cover 76 is a flat panel which fits over the compartments 88 and 90 and is provided with an inlet vent 94 over the radiator to permit the introduction of air into the compartment 90; and side vents 95 as represented in FIG. 5 permit the flow of additional air into the radiator compartment from opposite sides. A series of exhaust vents 96 are provided in the cover and are aligned over the fan units 74. In this way, the fan units will draw air through the inlet vent 94, side vents 95 as well as the vents 84 to pass through the radiator cores and to exit through the openings 93 into the fan housing 88 and is then discharged upwardly by the fan units 74 through the exit vents 96.

Roof-mounting of the battery compartment 12 and radiator compartment 14 as described frees up space in the interior of the bus, for example, to afford more space for the location of the internal combustion engine 32, electric motor and other components shown in the rear machinery compartment 30 and further allowing more space for air circulation. At the same time, more space is available on the roof of the vehicle for the radiator units and battery packs as described. As discussed earlier, other utility components may be mounted on the roof including but not limited to air conditioning systems of the type disclosed in my earlier patents and is equally useful in mounting evaporator systems in combination with heater blocks for use in vehicles used in colder climates and which do not require the complete air conditioning system.

It is therefore to be understood that while different exemplary embodiments are herein set forth and described, the above and other modifications may be made therein as defined by the appended claims and reasonable equivalents thereof.

I claim:

1. A cooling system for a vehicle wherein said vehicle is provided with a roof, side walls, front and rear end walls enclosing a passenger section, a motive power source, transmission and electronic control package, the combination therewith comprising:

a modular, low profile compartment mounted on said roof including at least one radiator core mounted in a substantially horizontal position in said compartment, said radiator core(s) being spaced above said roof;

means for drawing air through said compartment; and wherein at least one of said radiator cores along one side of said roof is divided into separate radiator sections, first coolant lines extending between one of said radiator cores and said transmission, and second coolant lines extending between another of said radiator cores and said electronic component package.

2. A cooling system according to claim 1 wherein coolant lines extend between one of said radiator cores and said motive power source.

3. A cooling system according to claim 1 wherein coolant lines extend between one of said radiator cores and said electronic control package.

4. A cooling system according to claim 1 wherein coolant lines extend between one of said radiator cores and said transmission.

5. A cooling system according to claim 1 wherein a pair of said radiator cores are horizontally mounted in said compartment for lengthwise extension in spaced relation to one another along opposite sides of said roof.

6. A cooling system according to claim 5 wherein said means are defined by fans mounted in said compartment between said radiator cores.

7. A cooling system according to claim 5 wherein each of said radiator cores are sloped upwardly toward one another and at an acute angle to said roof.

8. A cooling system according to claim 1 wherein said means is operative to draw air into an underside of said compartment for discharge upwardly and away from said compartment.

9. In a cooling system for a vehicle wherein said vehicle is provided with a roof, side walls, front and rear end walls enclosing a passenger section, a plurality of modular, low profile roof-mounted compartments in end-to-end relation to one another, a motive power source, transmission and electronic control package, the combination therewith comprising:

each of said compartments having opposite side and end walls and a cover;

at least one radiator core mounted in one of said compartments and in substantially horizontal, spaced relation to and above said roof;

means for drawing air through inlet openings at least along one side of said one compartment across said radiator core(s) and upwardly through outlet openings in said cover, and coolant lines extending between said radiator core and said motive power source; and wherein at least one of said radiator cores along one side of said roof is divided into separate radiator sections, and coolant lines extending between one of said radiator sections and said transmission, and coolant lines extending between another of said radiator sections and said electronic component package.

10. A cooling system according to claim 9 wherein a pair of said cores are horizontally mounted in said one compartment for lengthwise extension in spaced relation to one another along opposite sides of said roof.

11. A cooling system according to claim 10 wherein said inlet openings are disposed in said opposite side walls and said outlet openings are disposed in said cover.

12. A cooling system according to claim 9 wherein said means is defined by fans mounted in said one compartment between said radiator(s) cores.

13. A cooling system according to claim 9 wherein each of said radiator cores is sloped upwardly toward one another and at an acute angle to said roof.

14. A cooling system according to claims 1 or 9 wherein another of said compartments includes a plurality of batteries extending horizontally in juxtaposed relation to one another including means for connecting said batteries to said transmission whereby to serve as a substitute motive power source.

* * * * *